L. J. RANDALL.
Preparing Cheese for Market.

No. 53,043.

Patented March 6, 1866.

Witnesses:
W. H. Burridge
A. W. McClellan

Inventor:
L. J. Randall

UNITED STATES PATENT OFFICE.

L. J. RANDOLL, OF CHARDON, OHIO.

IMPROVEMENT IN PREPARING CHEESE FOR MARKET.

Specification forming part of Letters Patent No. 53,043, dated March 6, 1866.

*To all whom it may concern:*

Be it known that I, L. J. RANDOLL, of Chardon, in the county of Geauga and State of Ohio, have invented certain new and useful Improvements in the Mode of Preparing Cheese for Market; and I do hereby declare that the following is a full and complete description of the same, reference being had to the accompanying drawings, making a part of this specification, in which—

Figure 1:
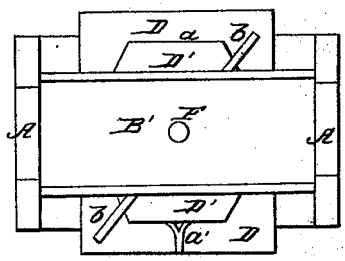
Figure 2:
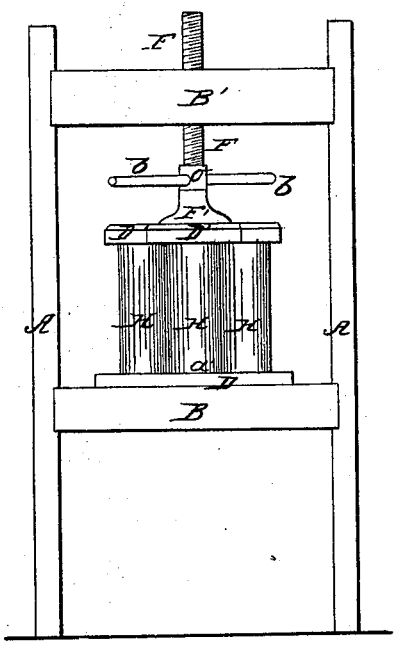
Figure 3:
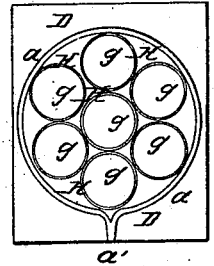

Figure 1 is a plan view of the machine for pressing the cheese. Fig. 2 is a side view. Fig. 3 is a view showing the cheese arranged in a series for pressing.

Like letters of reference refer to like parts in the several views.

My improvement relates to pressing cheese in a series of two or more hoops arranged on the platen in place of one large hoop, making a number of small cheeses of a cylindrical form, all pressed at the same time by one continuous operation, arranged as hereinafter described.

The machine is constructed, as shown in Figs. 1 and 2, with end pieces, A, and cross-pieces B B' secured to them, between which the cheese is pressed.

On the cross-piece or platform B the platen D is placed, on which a series of hoops, H, are arranged. The hoops are of a cylindrical form, in the upper end of each of which is a follower, $g$, (seen in Fig. 3,) that presses down upon the curd in the hoops. Above the followers $g$ or hoops is a follower, D', of the machine, that a head, F', on the end of a screw, F, in the cross-piece B is screwed down upon by means of a lever, $b$, put across through the head, as represented.

A series of circular hoops are placed upon the platen D closely together. Seven can be arranged, one in the center, and the others round on the outside, as shown in Fig. 3, so as to occupy less room for the amount of cheese pressed than any other number. The hoops are filled with curd in the usual way and a follower, $g$, put on the top in each one, when the follower D' is placed on the top of all of them, which, as the head F' is screwed down, presses the follower $g$ in each of the hoops down upon the curd, pressing the cheese in the desired manner. The whey is carried off in a circular groove, $a$, in the platen, that turns out at one side, as at $a'$.

There are many advantages of having cheese in this form and size, each cheese weighing from seven to ten pounds: The convenience with which it can be retailed, each cheese being the amount that it is usually desired to purchase. There is no trouble of cutting up a large cheese, which makes so much surface, both on the cheese and piece cut off, to become dry. The purchaser can have a whole cheese of a convenient shape for cutting as it is needed, when it can be turned down on the cut and no surface exposed to dry. It is accompanied with no more trouble or labor to press cheese in this form than in the ordinary way, and it is much easier and more convenient to handle.

The curd in the several hoops is of the same quality, and it is first weighed, so that the same quantity will be in each one, and, there being a uniform pressure on all of them at one time, the cheeses will be of the same size, weight, and quality.

I claim—

The herein-described mode of pressing cheese separately in a series of hoops under pressure simultaneously by the action of the screw, for the purpose set forth, and arranged as specified.

L. J. RANDOLL.

Witnesses:
W. H. BURRIDGE,
A. W. McCLELLAND.